(12) United States Patent
Lewicki et al.

(10) Patent No.: US 9,260,571 B2
(45) Date of Patent: Feb. 16, 2016

(54) HYBRID POLYMER NETWORKS AS ULTRA LOW 'K' DIELECTRIC LAYERS

(71) Applicant: Lawrence Livermore National Security, LLC, Livermore, CA (US)

(72) Inventors: James Lewicki, Oakland, CA (US); Marcus A. Worsley, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 13/898,397

(22) Filed: May 20, 2013

(65) Prior Publication Data
US 2013/0317183 A1 Nov. 28, 2013

Related U.S. Application Data

(60) Provisional application No. 61/651,096, filed on May 24, 2012.

(51) Int. Cl.
*C08G 77/38* (2006.01)
(52) U.S. Cl.
CPC ..................... *C08G 77/38* (2013.01)
(58) Field of Classification Search
CPC ........................................................ C08G 77/38
USPC ................................................. 525/474–479
See application file for complete search history.

(56) References Cited

U.S. PATENT DOCUMENTS

| | | | | |
|---|---|---|---|---|
| 5,412,053 | A * | 5/1995 | Lichtenhan et al. | 528/9 |
| 6,204,202 | B1 * | 3/2001 | Leung et al. | 438/781 |
| 7,071,539 | B2 | 7/2006 | Nicholson et al. | |
| 7,179,758 | B2 | 2/2007 | Chakrapani et al. | |
| 7,470,634 | B2 * | 12/2008 | Shin et al. | 438/781 |
| 7,687,913 | B2 | 3/2010 | Chakrapani et al. | |
| 2005/0023689 | A1 | 2/2005 | Nicholson et al. | |
| 2005/0106762 | A1 | 5/2005 | Chakrapani et al. | |
| 2005/0165197 | A1 * | 7/2005 | Ogihara et al. | 528/32 |
| 2007/0138640 | A1 | 6/2007 | Chakrapani et al. | |
| 2009/0012317 | A1 * | 1/2009 | Laine et al. | 549/215 |
| 2010/0099790 | A1 * | 4/2010 | Manabe et al. | 522/172 |
| 2011/0003402 | A1 | 1/2011 | Chakrapani et al. | |
| 2013/0131264 | A1 * | 5/2013 | Nishimiya et al. | 524/588 |

FOREIGN PATENT DOCUMENTS

| WO | 2006/049595 A1 | 5/2006 |
|---|---|---|
| WO | 2007/058603 A1 | 5/2007 |
| WO | WO 2011148896 A1 * | 12/2011 |

OTHER PUBLICATIONS

Lewicki, et al ("The stablity of polysiloxanes incorporating nanoscale physical property modifiers", Sci Technol Adv. Mater., 9024403, p. 1-8, Jul. 7, 2008).*
Haddad, et al ("Polydimethylsiloxanes modified with polyhedral oligomeric silsesquioxanes: from viscous oils to thermoplastics", Polymer Preprints 39(1), p. 611-612, Mar. 1998).*
Degroot ("Silicones for Photonics" Chapter 12 of Inorganic Polymers, Edited by Roger De Jaeger and Mario GleriaNova Sceince Publishers, 2007).*
Gubbel ("Silicones for Electronic Applications" Chapter 11 of Inorganic Polymers, Edited by Roger De Jaeger and Mario GleriaNova Sceince Publishers, 2007).*
Su et al, (A New Type of Low-k Dielectric Films based on Polysilsesquioxanes, Advanced Materials 14 (19) p. 1369-1373 first published online Oct. 2002).*
Curing Definition, Hawley's Condensed Chemical Dictionary, Mar. 2007.*
Garrett et al., "Dielectric Breakdown of PDMS thin films" J. Micromech. Microeng. 23, p. 067001-067007, Apr. 2013.*
2,4,6,8 tetramethylcylcotetrasiloxane Sigma Aldrich listing, Jan. 2015.*
PSS Octavinyl substituted (octavinylsilsequioxane) Sigma Aldrich listing, Jan. 2015.*
Merhari "Hybrid Nanocomposites for Nanotechnology: Electronic, Optical, Magnetic and Biomedical Applications" p. 59, Mar. 2009.*
Monticelli et al., On a novel method to synthesize POSS based hybrids: An example of the preparation of a TPU system, eXPRESS Polymer Letters, 7 (12) 966-973, Dec. 2013.*
Valentini et al. Deposition of amino-functionalized polyhedral oligomeric silsesquioxanes on graphene oxide sheets immobilized onto an amino-silane modified silicon surface, Journal of Materials Chemistry, 22, p. 6213-6217, Feb. 17, 2012.*
Ray, Gary, Low Dielectric Constant Materials Integration Challenges, MRS Proceeding vol. 511 p. 199-211, Apr. 13-17 , 1998.*
Loy, et al., Bridged Polysilsesquioxanes. Highly Porous Hybrid Organic-Inorganic Materials, Chemical Reviews vol. 95 (5) p. 1431-1442, Jul. 1995.*
Vasilopoulou et al., "Characterization of various low-k dielectrics for possible use in applications at temperatures below 160 degrees celsius," Institute of Physics Publishing, Journal of Physics: Conference Series, vol. 10, 2005, Second Conference on Microelectronics, Microsystems and Nanotechnology, pp. 218-221.
Shi et al., "Adhesive-Free Transfer of Gold Patterns to PDMS-Based Nanocomposite Dielectric for Printed High-Performance Organic Thin-Film Transistors," 2011 American Chemical Society, ACS Applied Material Interfaces, vol. 3, 2011, pp. 1880-1886.
Mannsfeld et al., "Highly sensitive flexible pressure sensors with microstructured rubber dielectric layers," 2010 Macmillan Publishers Limited, Nature Materials, vol. 9, Oct. 2010, pp. 859-864.

(Continued)

*Primary Examiner* — Randy Gulakowski
*Assistant Examiner* — Christopher M Rodd
(74) *Attorney, Agent, or Firm* — Zilka Kotab

(57) ABSTRACT

According to one embodiment, a polymeric material includes at least one polydimethylsiloxane (PDMS) polymer, and at least one polyhedral oligomericsilsequioxane (POSS) molecule. According to another embodiment, a method includes providing at least one polydimethylsiloxane (PDMS) polymer, providing at least one polyhedral oligomericsilsequioxane (POSS) molecule, and coupling the at least one PDSM polymer to the at least one POSS molecule to form a hybrid polymeric material.

19 Claims, 4 Drawing Sheets

(56) References Cited

OTHER PUBLICATIONS

Xu et al., "Micropatternable elastic electrets based on a PDMS/carbon nanotube composite," IOP Publishing, Journal of Micromechanics and Microengineering, vol. 20, 2010, pp. 1-7.

Liu et al., "Polyhedral oligomeric silsesquioxane nanocomposites exhibiting ultra-low dielectric constants through POSS orientation into lamellar structures," The Royal Society of Chemistry, 2009, Journal of Materials Chemistry, vol. 19, 2009, pp. 3643-3647.

Chen et al., "Low-k Nanocomposite Films Based on Polyimides with Grafted Polyhedral Oligomeric Silsesquioxane," 2005 Wiley Periodicals, Inc., Journal of Applied Polymer Science, vol. 99, 2006, pp. 2226-2232.

Blaschta et al., "SiO2 aerogel ultra low k dielectric patterning using different hard mask concepts and stripping processes," 2004 Elsevier B.V., Microelectronic Engineering, vol. 76, Oct. 2004, pp. 8-15.

Cole et al., "Nanocontact Electrification through Forced Delamination of Dielectric Interfaces," ACS NANO, vol. 4, No. 12, 2010, pp. 7492-7498.

Das et al., "Development of Rigid-Flex and Multilayer Flex for Electronic Packaging," 2010 IEEE, Electronic Components and Technology Conference (ECTC 2010), pp. 568-574.

Graz et al., "Flexible pentacene organic thin film transistor circuits fabricated directly onto elastic silicone membranes," 2009 American Institute of Physics, Applied Physics Letters, vol. 95, 2009, pp. 243305/1-243305/3.

Geyter et al., "Medium and Atmospheric Pressure Plasma Treatment for Improvement of Adhesion of Pdms Used for Flexible and Stretchable Electronics," 2008, IEEE Conference on Polymers and Adhesives in Microelectronics and Photonics and 2008 IEEE Interdisciplinary Conference on Portable Information Devices, pp. 119-121.

Hong et al., "Porosity-induced electric field enhancement and its impact on charge transport in porous inter-metal dielectrics," 2006 IEEE, 44th Annual International Reliability Physics Symposium, pp. 679-680.

Hong et al., "Effect of porosity on charge transport in porous ultra-low-k dielectrics," Proceedings of the IEEE 2006 International Interconnect Technology Conference, pp. 140-142.

Hong et al., "Electric Field Ehancement Caused by Porosity in Ultra-Low-k Dielectrics," 2005, IEEE, pp. 434-437.

Hotta et al., "Flexible Distributed Capacitive Sensor With Encapsulated Ferroelectric Liquid," 2011 IEEE 24th International Conference on Micro Electro Mechanical Systems, Jan. 23-27, 2011, pp. 573-576.

Jo et al., "Fabrication of direct-printed OTFT array using flexible h-PDMS stamp," Sensors and Materials, vol. 19, No. 8, 2007, pp. 487-496.

Kolle et al., "Stretch-tuneable Dielectric Mirrors and Optical Microcavities," 2010 OSA, Optics Express, vol. 18, No. 5, Mar. 1, 2010, pp. 4356-4364.

Krause et al., "Electromechanical response of electrorheological fluids and poly(dimethylsiloxane) networks," 2001 American Chemical Society, Macromolecules, vol. 34, 2001, pp. 7179-7189.

Kubisz et al., "Magnetically induced anisotropy of electric permittivity in the PDMS ferromagnetic gel," 2010 Elsevier B.V., Journal of Non-Crystalline Solids, vol. 357, 2011, pp. 767-770.

Lewicki et al., "Effect of meta-Carborane on Segmental Dynamics in a Bimodal Poly(dimethylsiloxane) Network," 2008 American Chemical Societyy, Macromolecules, vol. 41, 2008, pp. 9179-9186.

Liu et al., "Synthesis of hydrophobic mesoporous silica films using poly(dimethylsiloxane)-poly(ethylene oxide) (PDMS-PEO) as co-template," 2011 Elsevier B.V., Microporous and Mesoporous Materials, vol. 145, 2011, pp. 182-187.

Lucas et al., "Microplasma stamps for selective surface modification: design and characterization," 2008 IOP Publishing Ltd., Journal of Physics D: Applied Physics, vol. 41, 2008, pp. 1-7.

Malynych et al., "Fabrication of two-dimensional assemblies of Ag nanoparticles and nanocavities in poly (dimethylsiloxane) resin," 2001 American Chemical Society, Nano Letters, vol. 1, No. 11, 2001, pp. 647-649.

Niklaus et al., "Ion-implanted compliant electrodes used in dielectric electroactive polymer actuators with large displacement," 2009 Elsevier B.V., Proceedings of the Eurosensors XXIII Conference, Procedia Chemistry, vol. 1, 2009, pp. 702-705.

Schwodiauer et al., "Flexible touch- and pressure sensitive piezo elastomer stretch sensor for simple surface position detection," 2008, 13th International Symposium on Electrets. ISE 13, pp. 1.

Tiercelin et al., "Polydimethylsiloxane membranes for millimeter-wave planar ultra flexible antennas," 2006 IOP Publishing Ltd., Journal of Micromechanics and Microengineering, vol. 16, 2006, pp. 2389-2395.

Yu et al., "Micropatterning and transferring of polymeric semiconductor thin films by hot lift-off and polymer bonding lithography in fabrication of organic field effect transistors (OFETs) on flexible substrate," 2011 Elsevier B.V., Applied Surface Science, vol. 257, 2011, pp. 9264-9268.

Zenasni et al., "The role of ultraviolet radiation during ultralow k films curing: Strengthening mechanisms and sacrificial porogen removal," 2007 American Institute of Physics, Journal of Applied Physics, vol. 102, pp. 094107/1-094107/8.

Larsen et al., "How to tune rubber elasticity," Smart Structures and Materials 2004: Electroactive Polymer Actuators and Devices (EAPAD), Proceedings of SPIE vol. 5385, Bellingham, WA 2004, pp. 108-117.

Companik et al., "The viscosity and ion conductivity of polydimethylsiloxane systems: 2. Ion concentration effects," 1994 Butterworth-Heinemann Ltd., Polymer, vol. 35, No. 22, 1994, pp. 4834-4838.

Lee et al., "Low-dielectric, nanoporous polyimide films prepared from PEO-POSS nanoparticles," 2005 Elsevier Ltd., Polymer, vol. 46, 2005, pp. 10056-10065.

Kujawski et al., "PDMS/graphite stretchable electrodes for dielectric elastomer actuators," Electroactive polymer Actuators and Devices (EAPAD) 2010 Proceedings of SPIE, vol. 7642, pp. 76420R/1-76420R/9.

Jo et al., "Fabrication of Organic Thin Film Transistor(OTFT) Array by using Nanoprinting Process," Key Engineering Materials, vol. 326-328, 2006, pp. 385-388.

Jo et al., "Roll-Printed Organic Thin-Film Transistor Using Patterned Poly(dimethylsiloxane) (PDMS) Stamp," 2010 American Scientific Publishers, Journal of Nanoscience and Nanotechnology, vol. 10, No. 5, 2010, pp. 3595-3599.

Jo et al., "Fabrication of OTFT Array with Coated Thin Film Dielectric and Printed Electrodes by using Microcontact Printing," Advanced Materials Research vols. 26-28, 2007, pp. 661-664.

Yu et al., "Direct-Printed Organic Thin-Film Transistor Using PDMS Stamp and Low Viscosity Nanosilver Ink," Journal of Nanoscience and Nanotechnology, vol. 8, No. 10, 2008, pp. 4940-4944.

Lewicki et al., "The Stability of Polysiloxanes Incorporating Nanoscale Physical Property Modifiers," Science and Technology of Advanced Materials, vol. 9, 2008, pp. 1-8.

Jo et al., "High Resolution Electrodes Fabrication for OUT Array by using Microcontact Printing and Room Temperature Process," Imid/Idmc 2006: The 6th International Meeting on Information Display/the 5th International Display Manufacturing Conference, Digest of Technical Papers, 2006, pp. 186-189.

Jo et al., "Plastic thin-film transistor with printed electrodes by using nanoprinting with h-PDMS stamp," Idw '06: Proceedings of the 13th International Display Workshops, vol. 1-3, 2006, pp. 1707-1710.

Roslaniec, Z., "Synthesis and characteristics of multiblock terpolymers with two flexible segments .1. Synthesis of poly(siloxane-ether-ester) terpolymers," Polimery, vol. 42, No. 6, 1997, pp. 367-372 (English Abstract included).

* cited by examiner

HYBRID POLYMER NETWORKS AS ULTRA LOW 'K' DIELECTRIC LAYERS

RELATED APPLICATIONS

This application claims priority to U.S. Provisional Application No. 61/651,096 filed May 24, 2012, the contents of which are herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to dielectric materials, and more particularly to ultra low 'k' dielectric materials comprising hybrid polymer networks and methods of making the same.

BACKGROUND

In the field of organic electronics, conductive polymeric and organic materials are utilized as the basis for integrated component fabrication rather than traditional metallic/inorganic materials. Organic electronic systems offer many potential advantages over conventional electronics including extremely low fabrication costs due to simple, yet robust fabrication methods, and the ability to form circuit elements onto flexible, cheap materials such as plastic or paper. Organic electronics also find application in many novel technological areas, including organic light emitting diodes, organic photovoltaics and organic touch screen displays. However, when compared with traditional silicon electronics, organic electronics have slow 'switching times' (e.g. operational speed) and fewer individual elements can be packed per unit area. Accordingly, focus has shifted to developing suitable dielectric insulating layers used to separate operational conductive elements.

Dielectric layers are critical to the function of microelectronic devices. An effective dielectric layer is generally characterized as having a low dielectric constant, k. The value of 'k' is a basic property of a material and is governed by its structural and electronic properties. For example, a low k material is an insulating material that exhibits weak polarization when subjected to an externally applied electric field. Lower k-values typically equate to better dielectric properties, reductions in component size, increases in packing density and higher switching speeds.

However, existing polymeric materials for use as dielectrics, e.g. fluoropolymers, polyamides, thin film silica, etc., often do not possess the mechanical, thermal and electronic properties necessary to enable the next generation of robust yet flexible organic electronic devices. For example, existing porous polymeric materials often are typically fragile mechanically due, for example, their low Young's modulus. Improvements are thus needed in regard to methods and compositions for nanoporous polymeric materials having low dielectric constants.

SUMMARY

According to one embodiment, a polymeric material includes at least one polydimethylsiloxane (PDMS) polymer, and at least one polyhedral oligomericsilsequioxane (POSS) molecule.

According to another embodiment, a method includes providing at least one polydimethylsiloxane (PDMS) polymer, providing at least one polyhedral oligomericsilsequioxane (POSS) molecule, and coupling the at least one PDSM polymer to the at least one POSS molecule to form a hybrid polymeric material.

Other aspects and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, reference should be made to the following detailed description read in conjunction with the accompanying drawings.

DETAILED DESCRIPTION

Figure 1:
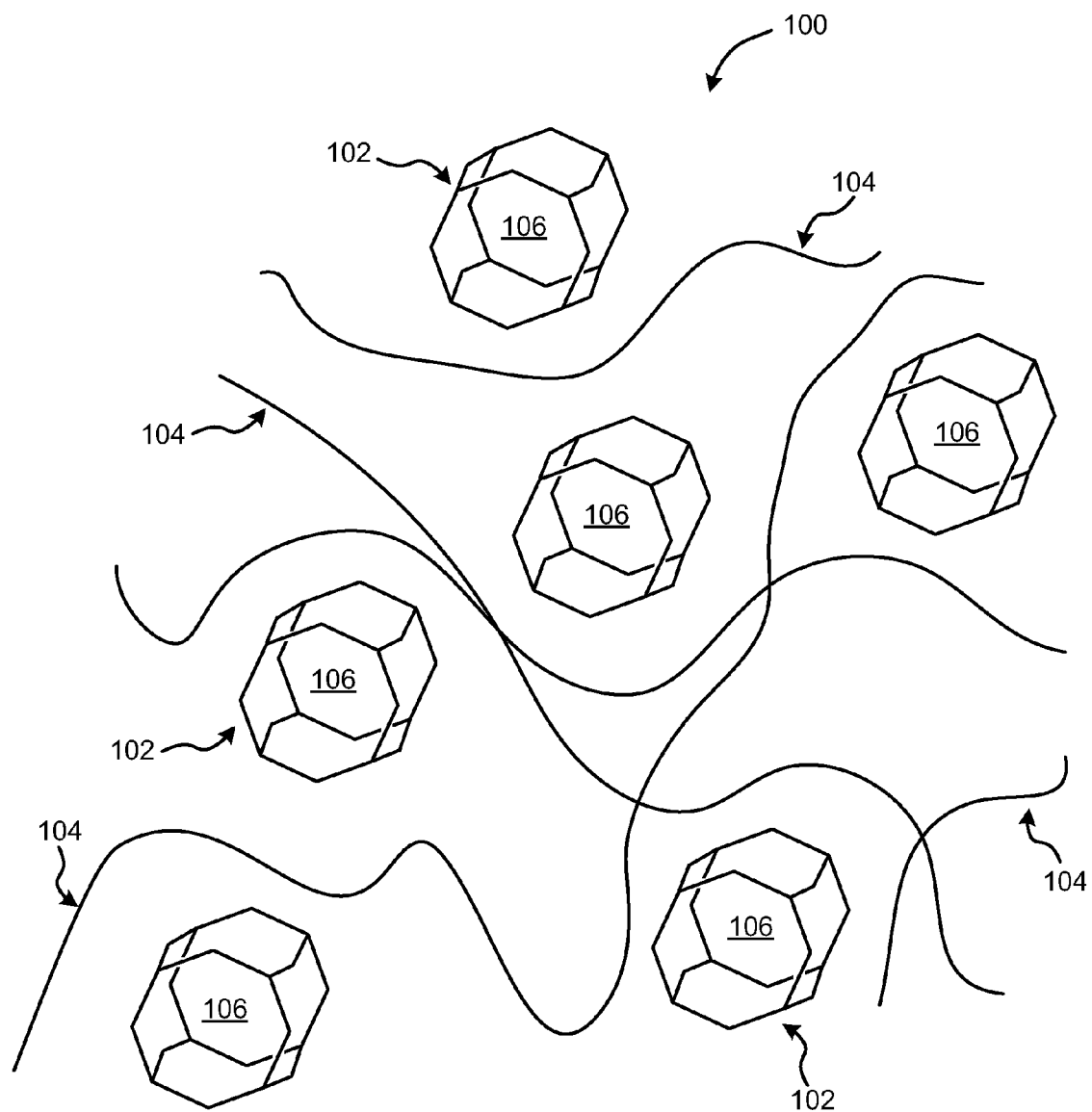
FIG. 1 shows a schematic diagram of polyhedral oligomericsilsesquioxane (POSS) molecules incorporated into a network of polymer chains, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Further, as used herein, the term "about" when combined with a value refers to plus and minus 10% of the reference value. For example, a length of about 1000 nm refers to a length of 1000 nm±100 nm, a temperature of about 50° C. refers to a temperature of 50° C.±5° C., etc.

As also used herein, the term "low k" refers to a dielectric constant between about 4 and about 2. Additionally, the term "ultra low k" refers to a dielectric constant less than about 2.

As noted above, the field of organic electronics is rapidly expanding into wide-scale technological application. However, the development of the next generation organic devices (e.g. wearable and 'wrap-around' displays, smart-packaging, interactive paper, flexible thin-film organic solar cells, etc.) is currently limited due to several technological challenges. For example, existing organic electronic devices typically exhibit slow operational speeds and low packing densities (i.e. fewer individual functional elements can be packed per unit area as compared to traditional silicon devices). Thus, focus has shifted to developing suitable dielectric insulating layers used to separate operational conductive elements in such organic devices.

Dielectric layers for flexible organic electronics must fulfill a number of requirements in order to be practical. For example, the dielectric must be compatible with the manufacturing process (i.e. solvent or melt processable), it must be mechanically robust (flexible yet strong), the k-value must at least be less than 4, etc. As such, many existing organic electronics fabrication processes utilize polymeric materials as dielectrics either as a separate printed coating layer or as the base substrate itself. The polymeric materials currently employed (polyamides, fluoropolymers etc.) typically have k-values ranging from about 4 to about 2. However it is widely accepted that if the performance of flexible organic electronics is to be improved further and the range of applications are to be successfully expanded, then the next generation of dielectric layer materials will require K-values below ~2.

Accordingly, the following description discloses several preferred embodiments of dielectric materials comprising hybrid polymer networks and/or related systems and methods. Specifically, various embodiments disclosed herein provide a novel class of flexible hybrid polymeric materials that have an ultra low dielectric constant 'k' (k<~2) for use as an improved dielectric layer in organic electronics and other suitable electronic devices. These ultra low k hybrid polymeric materials exhibit better dielectric properties, enable reductions in component size, increases in packing density and higher switching speeds as compared to existing low k polymeric materials.

In numerous embodiments, the ultra low k hybrid polymeric materials described herein may comprise a specified amount of 'free-space' (e.g. porosity), which effectively serves to reduce the dielectric constant of the polymeric materials to a level not yet attained in other existing polymeric dielectrics (e.g. a dielectric constant closer to the theoretical limit of 1.0, the k-value of air). For example, in some approaches, an ultra low k hybrid polymeric material may include one or more polyhedral oligomericsilsequioxane (POSS) molecules coupled to, or chemically incorporated into, a polymeric network comprising one or more polydimethylsiloxane (PDMS) polymers. In various approaches, the one or more POSS molecules may be characterized as nanoscale 'empty' cages of silica and may serve to lower the effective density, and increase the free volume, of the polymeric network, thereby lowering the dielectric constant of the polymeric network. Thus, by virtue of its structural architecture, a hybrid polymeric material having a PDMS network incorporating POSS cages may have a dielectric constant that is significantly lower than a polymeric material having an unmodified PDMS network (i.e. a PDMS network without POSS cages). In preferred embodiments, the hybrid polymeric materials comprising one or more PDMS polymers and one or more POSS molecules (e.g. cages) may have a dielectric constant less than about 2, less than about 1.5, etc.

Further, in more approaches, the POSS cages may mechanically reinforce the PDMS network, thereby improving the modulus and tear strength of the polymeric material as a whole.

According to additional embodiments, the hybrid polymeric materials disclosed herein may be characterized as having 'tunable' physical properties, which include, but are not limited to, one or more of a dielectric constant, a modulus, a tear strength, a hardness, a refractive index, thermal stability, a glass transition temperature, etc. For instance, these physical properties may be tuned by modifying one or more chemical properties and/or structural aspects of the hybrid polymeric material. Modifying the chemical properties and/or structural aspects of the hybrid polymeric material may involve altering: the modality of a PDMS network incorporating at least one POSS cage; one or more functional groups present on the POSS cage(s) and/or the PDMS polymer(s); the structural position of the POSS cage(s) in the network of PDMS; the molar ratio of the POSS cage(s) relative to the PDMS polymer(s); the manner in which the POSS cage(s) is incorporated into, or coupled to, the PDMS network (e.g. as a free chain end moiety, a chain pendant moiety, a cross linking site, etc.); an intercrosslink chain link length, etc. The ability to modify or control the chemical properties and/or structural aspects of a network including PDMS polymer(s) and POSS cage(s) may allow key physical properties such as the dielectric constant and mechanical strength, of the resulting hybrid polymeric material to be tailored to specific applications.

In one general embodiment, a polymeric material includes at least one polydimethylsiloxane (PDMS) polymer, and at least one polyhedral oligomericsilsequioxane (POSS) molecule.

In another general embodiment, a method includes providing at least one polydimethylsiloxane (PDMS) polymer, providing at least one polyhedral oligomericsilsequioxane (POSS) molecule, and coupling the at least one PDSM polymer to the at least one POSS molecule to form a hybrid polymeric material.

Now referring to FIG. 1, an exemplary polymeric material 100 is shown according to one embodiment. As an option, the polymeric material 100 may be implemented in conjunction with features from any other embodiment listed herein, such as those described with reference to the other FIGS. Of course, the polymeric material 100 and others presented herein may be used in various applications and/or in permutations which may or may not be specifically described in the illustrative embodiments listed herein.

As shown in FIG. 1, one or more polyhedral oligomericsilsequioxane (POSS) molecules 102 are incorporated into a polymeric network comprising one or more polymer chains 104. In one approach, the one or more polymer chains 104 may comprise a siloxane polymer, such as PDMS. PDMS may be represented by the following formula:

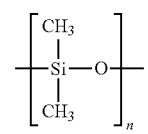

where n is equal to an integer in the range from about 5 to about 15,000.

With continued reference to FIG. 1, the molecular structure of the one or more POSS molecules 102 may comprise silicon atoms bridged to one another via oxygen atoms in such an arrangement so as to form a polyhedron, bowl-like, or any three dimensional form having an interior and exterior space associated with it. For example, POSS is typically referred to as a cage-shaped oligomer having the formula $R_n(SiO_{1.5})_n$, where n is 6, 8, 10, 12, 14 and 16. With regard to molecular structure, POSS typically has n vertices, with Si molecules positioned at each vertex and an R group attached to each Si. In some approaches, one of the vertices of the POSS cage may be opened, thereby forming a partially open cage structure.

Any or all of the $R_n$ groups in POSS may be a hydrogen, cyclic aliphatic, linear aliphatic, or aryl moiety, or a combination thereof. In some approaches, one or more of the R groups may be a reactive group for co-polymerization or grafting (generally referred to as a "linking group") including, but not limited to, an: epoxy, alkoxy, alkyl, methacrylate, acrylate, aryl, phenyl, allyl, vinyl carboxylic acid, halide, carboxylic acid halide, halosilane, ester, carboxylic acid ester, sulphonic acid ester, epoxide, isocyanate, nitrile, olefin, styrene, amine, alcohol, alkyl halide, aryl halide, sulphonic acid, sulphonic acid halide, phosphine, silanol, silane, etc. or other such suitable moiety as would be understood by one having skill in the art upon reading the present disclosure. In other approaches where not all of the $R_n$ groups are a reactive linking group for co-polymerization or grafting, the remaining groups may be a nonreactive organic moiety.

As used herein, the one or more POSS molecules 102 may be referred to as monofunctional POSS where only one of the $R_n$ groups is a reactive group for polymerization or grafting, and as multifunctional (or polyfunctional) POSS where more than one of the $R_n$ groups are a reactive group for polymerization or grafting.

Figure 2A:
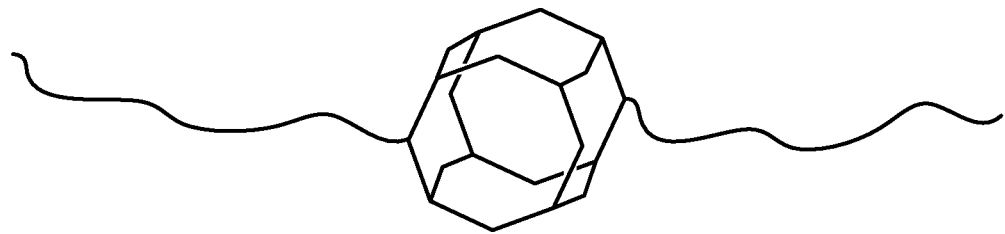
FIG. 2A shows a schematic diagram of a POSS molecules covalently coupled to two polymer chains as a crosslinking site, according to one embodiment.
Figure 2B:
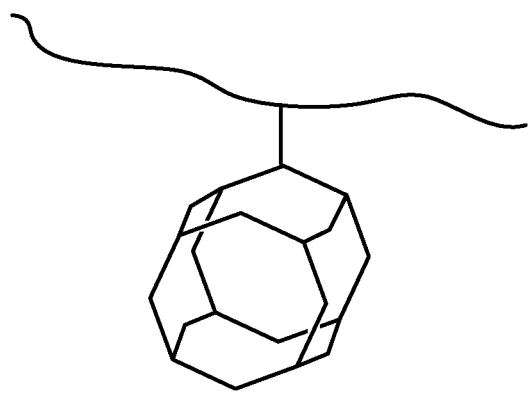
FIG. 2B shows a schematic diagram of a POSS molecules covalently coupled to a polymer chain as chain pendant moiety, according to one embodiment.
Figure 2C:
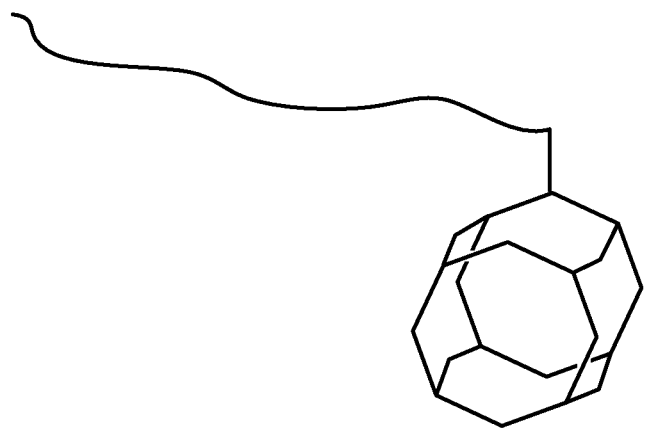
FIG. 2C shows a schematic diagram of a POSS molecules covalently coupled to a polymer chain as a free chain end moiety, according to one embodiment.

In various embodiments, the one or more POSS molecules 102 may be incorporated covalently into the polymeric network as a cross linking site (shown in FIG. 2A), as a free chain end moiety (as shown in FIG. 2B), as chain pendant moiety (as shown in FIG. 2C), etc. or a combination thereof. As an example only, consider the case where there are six POSS molecules covalently incorporated into the polymeric network. In such a case, one of the POSS molecules may be covalently incorporated into the polymeric network as a cross linking site, two of the POSS molecules may be covalently incorporated into the polymeric network as a free chain end moiety, and the remaining three POSS molecules may be covalently incorporated into the polymeric network as a chain pendant moiety.

In additional approaches, a height, length and width of the POSS cage may be between about 1 nm to about 3 nm, preferably about 1.5 nm.

Figure 3:
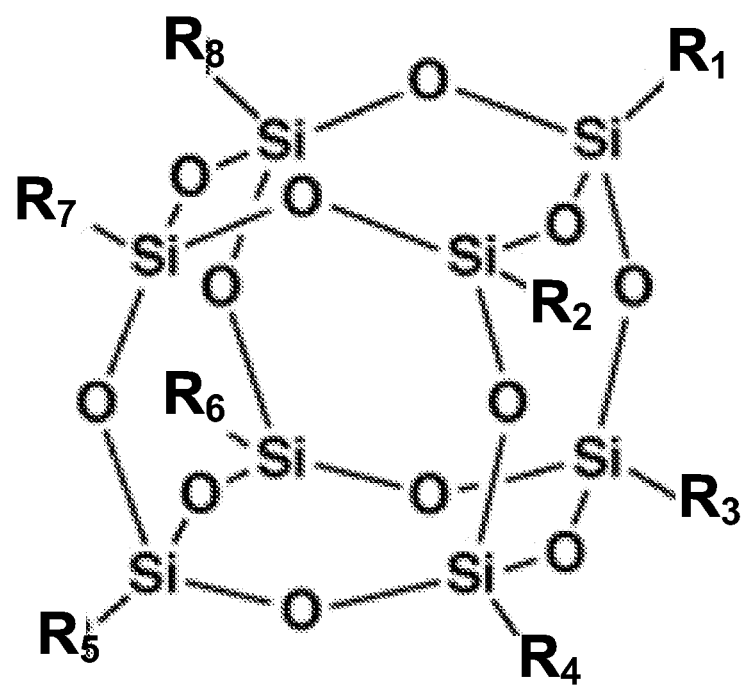
FIG. 3 shows a schematic diagram of an exemplary POSS molecule represented by the formula $R_8(SiO_{1.5})_8$.

FIG. 3 illustrates an exemplary POSS molecule represented by the formula $R_8(SiO_{1.5})_8$. As discussed above, each of the R groups (e.g. $R_1$, $R_2$, $R_3$, $R_4$, $R_5$, $R_6$, $R_7$ and $R_8$) may independently be a reactive group for co-polymerization or grafting, or a nonreactive organic functional group. Additionally, some or all of the R groups (e.g. $R_1$, $R_2$, $R_3$, $R_4$, $R_5$, $R_6$, $R_7$ and $R_8$) may be the same and/or different from one another.

Referring again to FIG. 1, it is important to note that the POSS molecules 102 are not necessarily limited to a POSS molecule having the formula $R_8(SiO_{1.5})_8$ (as shown in FIG. 3). For instance, in some embodiments, some or all of the POSS molecules 102 may have different molecular formulas $R_n(SiO_{1.5})_n$, and/or a different molecular structures (e.g. cage shapes/geometries). In additional embodiments, some or all of the POSS molecules 102 may have different functional groups from one another. For example, one or more of the R groups on one POSS molecule may be different from the one or more R groups present on another POSS molecule. In more embodiments, the manner in which some or all of the POSS molecules may be incorporated covalently into the polymeric network may be different (e.g. as an intercrosslink site, a free chain end moiety, a chain pendant moiety, etc.). Thus, some or all of the POSS molecules 102 incorporated into the polymeric network of polymer chains 104 may be the same or different with regard to their molecular structure (e.g. the structural architecture of the cage), and/or molecular formula, and/or chemical functionality, and/or the manner in which the POSS molecules are incorporated into, or coupled to, the polymeric network, etc.

As also shown in FIG. 1, the POSS molecules 102 each possess a well defined internal 'free volume' 106. Thus, each of the POSS molecules 102, which have an internal free volume 106, may effectively act as nano scale holes, thereby increasing the level of free space, and lowering the density, of the polymeric material 100. Accordingly, incorporation of said POSS molecules 102 into the polymeric network of one or more polymer chains 104 thereby produces a porous polymeric material 100. In some embodiments, the polymeric material 100 may have a porosity from between about 15% to about 80%.

In one approach, the degree of porosity in the polymeric material 100 (e.g. the amount of the internal free volume present in the polymeric material 100 comprising one or more POSS molecules/cages) may be measured using positron annihilation lifetime spectroscopy, xenon nuclear magnetic resonance (NMR) spectroscopy, or other such suitable technique as would be understood by one having skill in the art upon reading the present disclosure.

Additionally, the incorporation into the polymeric network of one or more POSS molecules 102 having an internal free volume 106 may result in a low and/or ultra low k polymeric material 100. In various approaches, the polymeric material 100 may be characterized as exhibiting a dielectric constant less than about 4 and greater than zero. In more approaches, the polymeric material 100 may be characterized as exhibiting a dielectric constant less than about 2 and greater than zero.

In yet other embodiments, a product may comprise a substrate and a dielectric layer comprising the polymeric material described herein (e.g. a polymeric material comprising at least one PDMS polymer and at least one POSS molecule). In some approaches, the dielectric layer may be used as an inter-layer dielectric to electrically separate the substrate from a first metal layer in an integrated circuit. In other approaches, the dielectric layer may be used as inter-metal dielectric to electrically separate two or adjacent metal layers. In more approaches, the dielectric layer has a thickness ranging from about 100 nm to about 200 µm. In preferred approaches, the product may be at least one of: a printable electronic device, an organic electronic device, a light emitting diode, a photovoltaic cell, a touch screen display, a wrap-around display, a wearable display, an interactive paper, etc. or other such device as would be understood by one having skill in the art upon reading the present disclosure.

Figure 4:
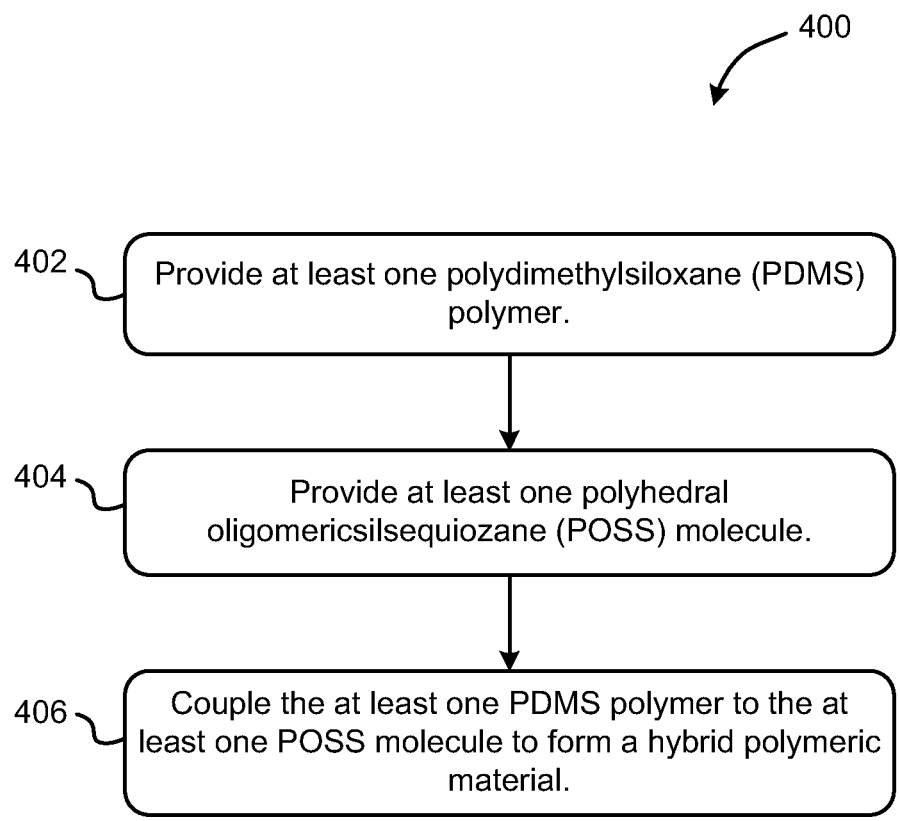
FIG. 4 is a flowchart of a method, according to one embodiment.

Referring now to FIG. 4, a method 400 for forming a hybrid polymeric material is shown in accordance with one embodiment. As an option, the present method 400 may be implemented in conjunction with features from any other embodiment listed herein, such as those shown in the other FIGS. described herein. Of course, this method 400 and others presented herein may be used in various applications and/or permutations, which may or may not be related to the illustrative embodiments listed herein. Further, the methods presented herein may be carried out in any desired environment. Moreover, more or less operations than those shown in FIG. 4 may be included in method 400, according to various embodiments. It should also be noted that any of the aforementioned features may be used in any of the embodiments described in accordance with the various methods.

As shown in FIG. 4, at least one polydimethylsiloxane (PDMS) polymer is provided. See operation 402. In one approach, the PDMS polymer has a molar mass between about 500 to about 10,000 grams per mole.

As also shown in FIG. 4, at least one polyhedral oligomericsilsesquioxane (POSS) molecule is provided. See step 404. The at least one POSS molecule is a cage-shaped oligomer that may be represented by the formula $R_n(SiO_{1.5})_n$, where n may be 6, 8, 10, 12, 14 and/or 16. In some approaches, one of the vertices of the cage structure may be opened, thereby forming a partially open POSS cage structure. In a preferred embodiment, the at least one POSS molecule may be represented by the formula $R_8(SiO_{1.5})_8$.

Additionally, any or all of the $R_n$ groups in the at least one POSS molecule may be a hydrogen, cyclic aliphatic, linear aliphatic, or aryl moiety or a combination thereof. In some approaches, one or more of the R groups may a reactive group for co-polymerization or grafting (generally referred to as a "linker") including, but not limited to, an: epoxy, alkoxy, alkyl, methacrylate, acrylate, aryl, phenyl, allyl, vinyl carboxylic acid, halide, carboxylic acid halide, halosilane, ester, carboxylic acid ester, sulphonic acid ester, epoxide, isocyanate, nitrile, olefin, styrene, amine, alcohol, alkyl halide, aryl halide, sulphonic acid, sulphonic acid halide, phosphine, silanol, silane, etc. or other such suitable moiety as would be understood by one having skill in the art upon reading the present disclosure. In other approaches where not all of the $R_n$ groups are a reactive group for co-polymerization or grafting, the remaining groups may be a nonreactive organic moiety.

In a preferred approach, the POSS molecule may represented by the formula $R_8(SiO_{1.5})_8$, where some or all of the R groups $R_1$, $R_2$, $R_3$, $R_4$, $R_5$, $R_6$, $R_7$ and $R_8$) may be the same or different and where each of the R groups may be a reactive group for co-polymerization or grafting, or a nonreactive organic functional group.

In additional approaches the at least one POSS molecule may be present in an amount from about 10% to about 40% by weight. In more approaches, a molar ratio of POSS to PDMS may be about 1:8 to about 8:1.

With continued reference to FIG. 4, the method 400 also includes coupling the at least one PDMS polymer to the at least one POSS molecule to form a hybrid polymeric material. See operation 406. According to one embodiment, the at least one POSS molecule may be coupled to a network comprising PDMS polymers via vinyl addition chemistry. In some approaches, a suitable catalyst may be used to facilitate the vinyl addition reactions, including, but not limited to platinum compounds, such as a Karstedt type catalyst (e.g. a Pt(0) type complex), etc. or other such suitable catalyst as would be recognized by one having skill in the art upon reading the present disclosure. As an illustrative example, a vinyl functionalized POSS molecule may be combined with one or more PDMS polymers comprising at least one silane end group. The vinyl functionalized POSS molecule may be represented by the formula $R_n(SiO_{1.5})_n$, where one, some or all of the $R_n$ functional groups are vinyl moieties. In order for the reaction to proceed at about room temperature, a Karstedt type catalyst may be added in an amount ranging from about 10 to about 100 ppm. Subsequently, the resulting POSS-PDMS hybrid polymeric material may be cured, thereby producing a low density, flexible yet mechanically robust, ultra low k hybrid polymeric material.

In typical platinum mediated vinyl additional chemistry (e.g. vinyl-silane reactions), a stoichiometric ratio of 1.75:1 silane to vinyl functionalities may be needed to get the resulting polymeric network to react and cure effectively. In vinyl rich systems, e.g. where the stoichiometric ratio of silane to vinyl functionalities is closer to 1:1, an increased amount of platinum may be used to encourage the reaction to proceed at room temperature. However, increasing the platinum content may lead to the formation of platinum nanoparticles, which may have undesirable interfacial charge interactions—e.g. a large charge mismatch—with the polymeric network, thereby increasing the dielectric constant of the polymeric network. Nonetheless, it has been surprising and unexpectedly found that a vinyl rich POSS molecule (e.g. a POSS molecule comprising a plurality of vinyl functional groups) may be coupled to a network comprising PDMS polymers via vinyl addition chemistry using catalyst concentrations about an order of magnitude less than those typically used if additional levels of small sometimes oligomeric silane molecules are included as 'cure rate accelerators' within a given formulation.

According to another embodiment, the at least one POSS molecule may be coupled to a network comprising PDMS polymers via condensation cure crosslinking chemistry in the presence of a suitable catalyst, e.g. a tin.

In another embodiment, the at least one POSS molecule may be incorporated into a network comprising the at least one PDMS polymer as at least one of a cross linking site, a free chain end moiety and a chain pendent moiety. In yet another embodiment, a plurality of POSS molecules may be incorporated into the network as at least two of crosslinking sites, free chain end moieties, and chain pendant moieties.

In an additional embodiment, the hybrid polymeric material may be characterized as exhibiting a dielectric constant of less than about 4 and greater than zero. In a further embodiment the hybrid polymeric material may be characterized as exhibiting a dielectric constant of less than about 2.0 and greater than zero. For instance, it has been surprisingly found that a PDMS-POSS hybrid polymeric material comprising about 40% POSS by weight has a nominal dielectric constant in the range of about 1.2 to about 1.5.

In another approach, a glass transition temperature of the hybrid polymeric material may be about −90° C., about −80° C., or higher. The glass transition temperature of an unmodified siloxane polymer, e.g. PDMS, is about −125° C. Accordingly, in some approaches, the method 400 may include modifying the amount of POSS molecules provided, and/or coupled to a network of one or more PDMS polymers, in order to produce a hybrid polymeric material with a desired glass transition temperature. In more approaches, the method may include increasing the amount of POSS molecules provided, and/or coupled to the network of one or more PDMS polymers, until the resulting hybrid polymeric material becomes partially or fully amorphous.

In yet another approach, the hybrid polymeric material may be compatible with wet organic fabrication processes. For example, the hybrid polymeric material may be characterized as being solvent and/or melt processable. Thus, in some approaches, the hybrid polymeric material may be compatible with, e.g. soluble in, most common solvents known in the art. In more approaches, the hybrid polymeric material, once dissolved in a solvent, may form a solution that may be easily coated onto and/or that easily adheres to various surfaces including, but not limited to, fluoralkanes, polyurethane, Kapton, a metal, elemental silicon, polymeric surfaces commonly used in electronic devices (e.g. semiconductors, organic electronics, etc.), and other such surfaces as would be understood by one having skill in the art upon reading the present disclosure.

Again with reference to FIG. 4, the provision and/or coupling of the at least one PMDS polymer and the at least one POSS molecule may include modifying one or more chemical and/or structural properties thereof for affecting one or more physical properties of the hybrid polymeric material, in another embodiment. For example, modifying said chemical properties and/or structural aspects may involve altering: the modality of a PDMS network incorporating at least one POSS cage; one or more functional groups present on the POSS cage(s) and/or the PDMS polymer(s); the structural position of the POSS cage(s) in the network of PDMS; the molar ratio of the POSS cage(s) relative to the PDMS polymer(s); the manner in which the POSS cage(s) is incorporated into, or coupled to, the PDMS network (e.g. as a free chain end moiety, a chain pendant moiety, a cross linking site, etc.); an intercrosslink chain link length; etc. Such modifications may affect one of more physical properties of the hybrid polymeric material, which include, but are not limited to, a dielectric constant, a modulus, a tear strength, a hardness, a refractive index, a viscosity, flexibility, thermal stability, a glass transition temperature, etc. For example, modifying the percentage of dangling free chains in the hybrid polymeric material (e.g. the percentage of POSS molecules coupled to the network of PDMS polymers as free chain end moieties) may alter the adhesion properties and/or flexibility of the hybrid polymeric material. Typically, a system with a greater percentage of dangling free chains may have a greater ability to adhere to surfaces.

In yet another embodiment, the method 400 may also include providing a third material and coupling the third material to the hybrid polymeric material. The third material may be selected from a group including, but not limited to, inorganic aerogels (e.g. silica aerogels), a cage structure comprising carborane (e.g. meta carborane), a zeolite, etc. In some approaches, the third material may have a polarity similar to the hybrid polymeric material so as to minimize polarity mismatch and the possible reduction of the hybrid polymeric material's dipole moment.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A polymeric material, comprising:
   a network of polydimethylsiloxane (PDMS) polymers; and
   at least one polyhedral oligomericsilsequioxane (POSS) molecule chemically coupled to at least one PDMS polymer,
   wherein the polymeric material has a porosity in a range from about 15% to about 80%,
   wherein a molar ratio of the at least one POSS molecule to the at least one PDMS molecule is in a range from about 8:1 to about 1:1,
   wherein the at least one POSS molecule is represented by $R_n(SiO_{1.5})_n$, wherein n is an even integer from 6 to 16, wherein at least one of the $R_n$ groups is a reactive functional group for co-polymerization, wherein the reactive functional group is selected from the group consisting of: a carboxylic acid halide, a sulphonic acid ester, a nitrile, a sulphonic acid, a sulphonic acid halide, a phosphine, and combinations thereof.

2. The polymeric material of claim 1, wherein the at least one POSS molecule is covalently coupled to the at least one PDMS polymer and to at least another PDMS polymer as a cross linking site.

3. The polymeric material of claim 1, wherein the at least one POSS molecule is covalently coupled to the at least one PDMS polymer as a free chain end moiety.

4. The polymeric material of claim 1, wherein the at least one POSS molecule is covalently coupled to the at least one PDMS polymer as a chain pendent moiety.

5. The polymeric material of claim 1, wherein the polymeric material includes a plurality of POSS molecules covalently coupled to the network, wherein at least one of the POSS molecules is covalently coupled to the network as a crosslinking site, wherein at least one of the POSS molecules is covalently coupled to the network as a free chain end moiety, and wherein at least one of the POSS molecules is covalently coupled to the network as a chain pendant moiety.

6. The polymeric material of claim 1, wherein the polymeric material is characterized as exhibiting a dielectric constant in a range from greater than about 1 to about 4.

7. A method for forming the polymeric material of claim 1, comprising:
   providing the network of polydimethylsiloxane (PDMS) polymers;
   providing the at least one polyhedral oligomericsilsequioxane (POSS) molecule; and
   chemically coupling at least one PDMS polymer to the at least one POSS molecule,
   wherein the polymeric material is characterized as exhibiting a dielectric constant in a range from about 1.2 to about 1.5.

8. The method of claim 7, wherein the providing at least one PDMS polymer and/or the providing at least one POSS molecule includes modifying one or more chemical and/or structural properties thereof for affecting one or more physical properties of the polymeric material.

9. A polymeric material, comprising:
   a network of polydimethylsiloxane (PDMS) polymers;
   at least one polyhedral oligomericsilsequioxane (POSS) molecule chemically coupled to at least one of the PDMS polymers,
   wherein the at least one POSS molecule is present in an amount from about 10% to about 40% by weight,
   wherein the at least one POSS molecule comprises at least one reactive functional group selected from the group consisting of: a carboxylic acid halide, a sulphonic acid ester, a nitrile, a sulphonic acid, a sulphonic acid halide, a phosphine, and combinations thereof; and
   a third material coupled to at least one of the PDMS polymers, wherein the third material comprises at least one of an inorganic aerogel and a zeolite.

10. A polymeric material, comprising:
    a network of polydimethylsiloxane (PDMS) polymers; and
    a plurality of POSS molecules covalently coupled to the network, wherein each POSS molecule comprises a reactive functional group,
    wherein the reactive functional group of at least two of the POSS molecules is different from the reactive functional group of at least another of the POSS molecules,
    wherein at least one of the POSS molecules is represented by $R_n(SiO_{1.5})_n$, wherein n is an even integer from 6 to 16, wherein at least one of the $R_n$ groups is a reactive functional group for co-polymerization, wherein the reactive functional group is selected from the group consisting of: a carboxylic acid halide, a sulphonic acid ester, a nitrile, a sulphonic acid, a sulphonic acid halide, a phosphine, and combinations thereof,
    wherein the polymeric material has a porosity in a range from about 15% to about 80%.

11. The polymeric material of claim 1, the polymeric material includes a plurality of POSS molecules covalently coupled to the network, wherein each POSS molecule is represented by $R_n(SiO_{1.5})_n$, n being even integer from 6 to 16, wherein at least one of the $R_n$ groups is a reactive functional group for co-polymerization, wherein at least one of the POSS molecules has a different integer value for n than at least another of the POSS molecules.

12. The polymeric material of claim 1, wherein the polymeric material is in a form of a film having a thickness in a range from about 100 nm to about 200 nm, wherein the polymeric material is positioned on a substrate comprising a fluoroalkane.

13. The polymeric material of claim 1, wherein the molar ratio of the at least one POSS molecule to the at least one PDMS molecule is in a range from about 8:1 to about 2:1.

14. The polymeric material of claim 1, wherein the molar ratio of the at least one POSS molecule to the at least one PDMS molecule is about 8:1.

15. The polymeric material of claim 1, wherein the polymeric material includes a plurality of POSS molecules covalently coupled to the network, wherein each POSS molecule is represented by $R_n(SiO_{1.5})_n$, n being even integer from 6 to 16, wherein at least one of the $R_n$ groups of each POSS molecule is a reactive functional group for co-polymerization, wherein the reactive functional group of at least one of the POSS molecules is different than the reactive functional group of at least another of the POSS molecules.

16. The polymeric material of claim 15, wherein the reactive functional group of each POSS molecule is different.

17. The polymeric material of claim 11, wherein the integer value n of each POSS molecule is different.

18. the polymeric material of claim 10, wherein at least one of the POSS molecules has a partially open cage structure, and wherein at least one of the POSS molecules has a closed cage structure.

19. The polymeric material of claim 10, wherein at least one of the POSS molecules is covalently coupled to the network as a crosslinking site, wherein at least one of the POSS molecules is covalently coupled to the network as a free chain end moiety, and wherein at least one of the POSS molecules is covalently coupled to the network as a chain pendant moiety.

* * * * *